US008029355B2

(12) United States Patent
Parente

(10) Patent No.: US 8,029,355 B2

(45) Date of Patent: Oct. 4, 2011

(54) CONFIGURABLE GAMING DEVICE WITH PLAYER SELECTABLE AWARD PROFILE

(75) Inventor: Robert J. Parente, Las Vegas, NV (US)

(73) Assignee: IGT, Reno, NV (US)

( * ) Notice: Subject to any disclaimer, the term of this patent is extended or adjusted under 35 U.S.C. 154(b) by 1323 days.

(21) Appl. No.: 11/642,243

(22) Filed: Dec. 19, 2006

(65) Prior Publication Data

US 2008/0146321 A1 Jun. 19, 2008

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ................ 463/21; 463/16; 463/20; 463/40; 463/42

(58) Field of Classification Search .................... 463/21, 463/40, 42, 16, 20

See application file for complete search history.

(56) References Cited

U.S. PATENT DOCUMENTS

| | | | | |
|---|---|---|---|---|
| 5,123,649 | A | 6/1992 | Tiberio | |
| 5,806,855 | A | 9/1998 | Cherry | |
| 5,811,772 | A * | 9/1998 | Lucero | 235/380 |
| 5,823,874 | A | 10/1998 | Adams | |
| 5,848,932 | A | 12/1998 | Adams | |
| 5,911,418 | A | 6/1999 | Adams | |
| 6,004,207 | A | 12/1999 | Wilson, Jr. et al. | |
| 6,062,981 | A | 5/2000 | Luciano, Jr. | |
| 6,068,552 | A | 5/2000 | Walker et al. | |
| 6,077,163 | A | 6/2000 | Walker et al. | |
| 6,089,976 | A | 7/2000 | Schneider et al. | |
| 6,089,978 | A | 7/2000 | Adams | |
| 6,155,925 | A | 12/2000 | Giobbi et al. | |
| 6,159,095 | A | 12/2000 | Frohm et al. | |
| 6,159,097 | A | 12/2000 | Gura | |
| 6,159,098 | A | 12/2000 | Slomiany et al. | |
| 6,186,894 | B1 | 2/2001 | Mayeroff | |
| 6,190,255 | B1 | 2/2001 | Thomas et al. | |
| 6,203,429 | B1 | 3/2001 | Demar et al. | |
| 6,224,483 | B1 | 5/2001 | Mayeroff | |
| 6,234,897 | B1 | 5/2001 | Frohm et al. | |
| 6,270,411 | B1 | 8/2001 | Gura et al. | |
| 6,290,603 | B1 | 9/2001 | Luciano, Jr. | |
| 6,315,664 | B1 | 11/2001 | Baerlocher et al. | |
| 6,322,309 | B1 | 11/2001 | Thomas et al. | |
| 6,334,814 | B1 | 1/2002 | Adams | |
| 6,375,570 | B1 | 4/2002 | Poole | |
| 6,394,902 | B1 | 5/2002 | Glavich et al. | |
| 6,413,161 | B1 | 7/2002 | Baerlocher et al. | |
| 6,419,578 | B1 | 7/2002 | Moody et al. | |

(Continued)

FOREIGN PATENT DOCUMENTS

AU 200065501 3/2001

(Continued)

*Primary Examiner* — Ronald Laneau

*Assistant Examiner* — Adetokunbo Torimiro

(74) *Attorney, Agent, or Firm* — K&L Gates LLP

(57) ABSTRACT

An apparatus and method for configuring a gaming device that provides a player selectable award profile. The award profile is further selectable by the player with respect to a payout scheme, a bonusing option or both. A player may select a preferred bonusing option form a group of available bonusing options prior to commencing play of the gaming device. A gaming device is provided that offers the player a choice of several bonusing options from a single source gaming device. Additionally, the player may also select a modified payout scheme that suits the player's preferences.

22 Claims, 5 Drawing Sheets

U.S. PATENT DOCUMENTS

| | | | |
|---|---|---|---|
| 6,439,995 | B1 | 8/2002 | Hughs-Baird et al. |
| 6,443,837 | B1 | 9/2002 | Jaffe et al. |
| 6,461,241 | B1 | 10/2002 | Webb et al. |
| 6,468,156 | B1 | 10/2002 | Hughs-Baird et al. |
| 6,494,785 | B1 | 12/2002 | Gerrard et al. |
| 6,511,375 | B1 | 1/2003 | Kaminkow |
| 6,514,141 | B1 | 2/2003 | Kaminkow et al. |
| 6,517,432 | B1 | 2/2003 | Jaffe |
| 6,554,704 | B2 | 4/2003 | Nicastro et al. |
| 6,558,254 | B2 | 5/2003 | Baelocher et al. |
| 6,565,436 | B1 | 5/2003 | Baerlocher et al. |
| 6,569,013 | B1 | 5/2003 | Taylor |
| 6,569,016 | B1 | 5/2003 | Baerlocher |
| 6,572,472 | B1 | 6/2003 | Glavich |
| 6,582,306 | B1 | 6/2003 | Kaminkow |
| 6,582,307 | B2 | 6/2003 | Webb |
| 6,585,591 | B1 | 7/2003 | Baerlocher et al. |
| 6,595,854 | B2 | 7/2003 | Hughs-Baird et al. |
| 6,599,185 | B1 | 7/2003 | Kaminkow et al. |
| 6,602,135 | B1 | 8/2003 | Gerrard |
| 6,602,136 | B1 | 8/2003 | Baerlocher et al. |
| 6,605,000 | B2 | 8/2003 | Adams |
| 6,607,437 | B2 | 8/2003 | Casey et al. |
| 6,609,974 | B2 | 8/2003 | Mead et al. |
| 6,612,927 | B1 | 9/2003 | Slomiany et al. |
| 6,616,142 | B2 | 9/2003 | Adams |
| 6,620,046 | B2 | 9/2003 | Rowe |
| 6,632,139 | B1 | 10/2003 | Baerlocher |
| 6,632,141 | B2 | 10/2003 | Webb et al. |
| 6,634,943 | B1 | 10/2003 | Baerlocher |
| 6,634,945 | B2 | 10/2003 | Glavich et al. |
| 6,645,073 | B2 | 11/2003 | Lemay et al. |
| 6,645,074 | B2 | 11/2003 | Thomas et al. |
| 6,648,754 | B2 | 11/2003 | Baerlocher et al. |
| 6,648,757 | B1 | 11/2003 | Slomiany et al. |
| 6,648,758 | B2 | 11/2003 | Bennett et al. |
| 6,663,489 | B2 | 12/2003 | Baerlocher |
| 6,682,419 | B2 | 1/2004 | Webb et al. |
| 6,682,420 | B2 | 1/2004 | Webb et al. |
| 6,685,560 | B1 | 2/2004 | Hughes |
| 6,688,975 | B2 | 2/2004 | Baerlocher et al. |
| 6,702,675 | B2 | 3/2004 | Poole et al. |
| 6,712,693 | B1 | 3/2004 | Hettinger |
| 6,719,632 | B2 | 4/2004 | Palmer et al. |
| 6,726,563 | B1 | 4/2004 | Baerlocher et al. |
| 6,726,565 | B2 | 4/2004 | Hughs-Baird |
| 6,733,386 | B2 | 5/2004 | Cuddy et al. |
| 6,733,389 | B2 | 5/2004 | Webb et al. |
| 6,739,971 | B2 | 5/2004 | Devaull |
| 6,746,016 | B2 | 6/2004 | Perrie et al. |
| 6,746,327 | B2 | 6/2004 | Frohm et al. |
| 6,749,504 | B2 | 6/2004 | Hughs-Baird |
| 6,758,747 | B2 | 7/2004 | Baerlocher |
| 6,761,632 | B2 | 7/2004 | Bansemer et al. |
| 6,769,983 | B2 | 8/2004 | Slomiany |
| 6,776,711 | B1 | 8/2004 | Baerlocher |
| 6,780,105 | B1 | 8/2004 | Kaminkow |
| 6,780,107 | B2 | 8/2004 | Baerlocher et al. |
| 6,780,111 | B2 | 8/2004 | Cannon et al. |
| 6,786,819 | B2 | 9/2004 | Baerlocher et al. |
| 6,793,578 | B2 | 9/2004 | Luccesi et al. |
| 6,796,901 | B2 | 9/2004 | Baerlocher |
| 6,796,904 | B2 | 9/2004 | Yoseloff |
| 6,802,778 | B1 | 10/2004 | Lemay et al. |
| 6,817,943 | B2 | 11/2004 | Gerrard |
| 6,824,467 | B2 | 11/2004 | Schlottmann et al. |
| 6,837,793 | B2 | 1/2005 | McClintic |
| 6,843,722 | B2 | 1/2005 | Webb |
| 6,869,361 | B2 | 3/2005 | Sharpless et al. |
| 6,884,165 | B2 | 4/2005 | Baerlocher |
| 6,981,917 | B2 | 1/2006 | Webb et al. |
| 6,986,709 | B2 | 1/2006 | Hughs-Baird et al. |
| 7,001,273 | B2 | 2/2006 | Baerlocher |
| 7,131,908 | B2 | 11/2006 | Baerlocher |
| 7,153,205 | B2 | 12/2006 | Baerlocher |
| 7,156,741 | B2 | 1/2007 | Hornik et al. |
| 7,169,046 | B2 | 1/2007 | Webb et al. |
| 7,175,523 | B2 | 2/2007 | Gilmore et al. |
| 7,198,569 | B2 | 4/2007 | Wolf et al. |
| 7,223,172 | B2 | 5/2007 | Baerlocher et al. |
| 7,278,919 | B2 | 10/2007 | Souza et al. |
| 7,329,179 | B2 | 2/2008 | Baerlocher |
| 7,399,228 | B2 | 7/2008 | Baerlocher |
| 7,419,429 | B2 | 9/2008 | Taylor |
| 7,513,827 | B2 | 4/2009 | Baerlocher |
| 7,841,939 | B2 | 11/2010 | Baerlocher et al. |
| 2001/0054794 | A1 | 12/2001 | Cole et al. |
| 2002/0193158 | A1 | 12/2002 | Weiss et al. |
| 2003/0176220 | A1 | 9/2003 | Baerlocher |
| 2003/0207713 | A1 | 11/2003 | Taylor |
| 2004/0023713 | A1 | 2/2004 | Wolf et al. |
| 2004/0038724 | A1 | 2/2004 | Asdale |
| 2004/0048649 | A1 | 3/2004 | Peterson et al. |
| 2004/0076503 | A1 | 4/2004 | Rau et al. |
| 2004/0127277 | A1 | 7/2004 | Walker et al. |
| 2004/0147306 | A1 | 7/2004 | Randall et al. |
| 2004/0171416 | A1 | 9/2004 | Baerlocher et al. |
| 2004/0209663 | A1 | 10/2004 | Webb et al. |
| 2004/0242313 | A1 | 12/2004 | Munoz |
| 2004/0248642 | A1 * | 12/2004 | Rothschild ..................... 463/20 |
| 2005/0009597 | A1 | 1/2005 | Daly |
| 2005/0032566 | A1 | 2/2005 | Baerlocher et al. |
| 2005/0054419 | A1 * | 3/2005 | Souza et al. .................... 463/20 |
| 2005/0064933 | A1 * | 3/2005 | Davis .............................. 463/20 |
| 2005/0070353 | A1 | 3/2005 | Webb et al. |
| 2005/0071023 | A1 | 3/2005 | Gilliland et al. |
| 2005/0181866 | A1 | 8/2005 | Baerlocher |
| 2005/0208992 | A1 | 9/2005 | Randall |
| 2005/0282625 | A1 | 12/2005 | Nicely |
| 2006/0025193 | A1 | 2/2006 | Gail et al. |
| 2006/0040728 | A1 | 2/2006 | Fuller |
| 2006/0063580 | A1 | 3/2006 | Nguyen et al. |
| 2006/0160620 | A1 | 7/2006 | Matthews et al. |
| 2006/0287034 | A1 | 12/2006 | Englman |
| 2007/0021182 | A1 | 1/2007 | Gauselmann |
| 2007/0060275 | A1 | 3/2007 | Gilmore et al. |
| 2007/0087804 | A1 | 4/2007 | Knowles et al. |
| 2007/0111778 | A1 | 5/2007 | Walker et al. |
| 2007/0117610 | A1 | 5/2007 | Webb et al. |
| 2007/0135207 | A1 | 6/2007 | Tarantino |
| 2007/0213119 | A1 | 9/2007 | Baerlocher et al. |
| 2007/0287532 | A1 | 12/2007 | Jackson |
| 2008/0026840 | A1 | 1/2008 | Souza et al. |
| 2008/0076503 | A1 | 3/2008 | Mattice et al. |
| 2008/0146321 | A1 | 6/2008 | Parente |
| 2009/0042652 | A1 | 2/2009 | Baerlocher et al. |
| 2009/0069063 | A1 * | 3/2009 | Thomas et al. ................. 463/16 |
| 2009/0088239 | A1 | 4/2009 | Iddings et al. |
| 2009/0124316 | A1 | 5/2009 | Baerlocher et al. |

FOREIGN PATENT DOCUMENTS

| | | |
|---|---|---|
| WO | WO2005/010831 | 2/2005 |
| WO | WO2006/002241 | 1/2006 |
| WO | WO2006/004831 | 1/2006 |
| WO | WO2007/090270 | 8/2007 |

* cited by examiner

CONFIGURABLE GAMING DEVICE WITH PLAYER SELECTABLE AWARD PROFILE

BACKGROUND OF THE INVENTION

1. Field of the Invention

The present invention relates to gaming machines, and in particular to a player selectable bonus round controlled by a central server.

2. Related Art

Games of chance have been enjoyed by people for many years and have undergone increased and widespread popularity in recent times. As with most forms of entertainment, some players enjoy playing a single favorite game, while others prefer playing a wide variety of games. In response to the diverse range of player preferences, gaming establishments commonly offer many types of games and attractions associated with these games. The attractions commonly take the form of enhanced bonuses, awards or prizes. For many players, playing new games or involvement with the various attractions adds to the excitement of "gaming."

As is well known in the art and as used herein, the terms "gaming" and "gaming devices" are used to indicate that some form of wagering is involved, and that players must make wagers of value, whether actual currency or some equivalent of value, e.g., token or credit. This is in contrast to the playing of non-wagering games, which implies the absence of a wager of value, and the possibility of receiving a payout; and in which skill is ordinarily an essential part of the non-wagering game.

One popular gaming system is a slot machine. Conventionally, a slot machine is configured for a player to wager something of value, e.g., currency, house token, established credit or other representation of currency or credit. After the wager has been made, the player activates the slot machine to cause a random event to occur. The player wagers that particular random events will occur that will return increased value to the player. A standard slot machine has a plurality of spinning reels which ultimately stop to display a random combination of some form of indicia, such as numbers or symbols. If this combination contains one or more pre-selected winning combinations, the gaming device releases money into a payout chute or increments a credit meter by the amount won.

Another type of slot machine is a video based gaming device which utilizes modern advancements in computer hardware and software. These electronic gaming devices provide games of chance with computer simulated graphics and offer different types of games such as video poker, keno and blackjack. It is common for these games to have a secondary game, commonly referred to as a "bonus round" that may be triggered from within the base game. The bonus round is used by the gaming establishment to provide the player with increased entertainment value and encourage continued wagering at the gaming device. A bonus round may be a wheel such as IGT's Wheel of Fortune® slot machine. There are also 'pick and win' and quest bonus rounds.

There are many different bonus incentives that a gaming establishment may offer to entice a player to place a wager at the gaming device. An example of such a bonus is a progressive jackpot that accumulates over time and increases based on the number of players participating in the progressive jackpot. Another example of a bonus involves a prize such as an automobile or fixed sum of currency. In a prize based bonus, if a player successfully obtains a winning bonus outcome that player is awarded the designated prize. The various bonuses offered by a gaming establishment are commonly assigned to a designated group of gaming devices and the groups are located in a bank of machines within the gaming establishment.

One drawback of existing systems is that in order for a player to participate in different types of bonuses, the player must physically move from one gaming device to another. At first glance, this drawback may not seem to be an overwhelming inconvenience. However, there are subtle undesirable consequences of requiring a player to switch machines in order to participate in a different bonusing scheme.

First, many players are devout in their belief about a "lucky machine" and are very reluctant to release the gaming device to another player. A player will likely become very disgruntled if they leave 'their' machine and a subsequent player begins playing the same gaming device and promptly hits or receives a substantial bonus. This situation is exacerbated when the original player has invested quite heavily into their machine just to prime the machine for another player to receive the bonus award. Correspondingly, these types of players are very reluctant to switch to another machine and the various bonuses offered by the gaming establishment may not receive adequate play.

Second, when a player has to relocate to participate in a different bonus, the gaming establishment runs the risk that the player may loose interest in continuing to play the games during the physical transition. This consequence is more prevalent when the player has to travel a substantial distance between machines, as is common in the very large gaming establishments. Additionally, in the now popular mega resorts, a typical player is usually overwhelmed with various stimuli when on the gaming floor. The stimuli are commonly various lounges, restaurants, shows, concerts and interaction with other patrons. A gaming establishment disfavors when a player transitions from an active player that is wagering on the games to a passive patron that is merely enjoying the environment and not wagering. As a result, this may lead to a reduction in player interest in slot gaming, which in turn will lead to a drop in machine revenue.

Finally, when a player has to transition from one grouping of gaming devices to another, the player is not wagering during this time. For smaller gaming establishments, this may not be a severe consequence. However for a major resort, the time interval may exceed 10-20 minutes and this lost wagering time reduces revenue generating opportunity for the gaming establishment.

One proposed solution is to simply include several types of primary games on a single gaming device. This proposed solution does not adequately address the problem however because although the player was provided a variety of primary games at common location, the player is still required to switch locations to participate in preferred bonus games.

Another solution is to have more than one bonus round in one game. One bonus round could be a 'pick and win' while another could be a wheel. Each different bonus round is triggered by a different reel combination. Some players may like one bonus round over another on a particular slot machine. If players liked all bonus rounds on a slot machine then there would be more enjoyment for the player. There could be my mystery bonus rounds which are not triggered by a reel combination.

In view of the above, what is needed is a gaming device which provides a player selectable bonus scheme.

SUMMARY OF THE INVENTION

In one embodiment disclosed herein a gaming device configured for a player selectable bonus options is disclosed. The gaming device includes a housing, a display within the housing for displaying, to a player, a game and one or more award profiles. The gaming device also includes a network interface for communication of an award profile over a network link, a user interface configured to receive player selections from the player, and a processor configured to cause the display to present one or more award profiles for player selection. Using this system, a player may select an award profile for use during play of the game.

It is contemplated that one or more award profiles may be available in which a first award profile and a second award profile are provided, such that the first award profile has no bonusing options and the second award profile has a plurality of bonusing options. This embodiment may further comprise a player selection option for a modified payout scheme in which the player may choose a first modification that provides increased payouts with a decreased payout frequency, or the player may choose a second modification that provides decreased payouts with increased payout frequency. Alternatively, the first award profile may comprise a non-modified payout scheme.

It is contemplated that the gaming device may comprise a network interface that is configured to transmit a selected award profile to a controller to thereby include or associate the gaming device with the selected award profile.

In one embodiment, the gaming device may comprise a choice of several bonusing options such as a mystery award, an award of physical goods, a progressive award, a wheel bonus round, a quest bonus round or pick-and-win bonus round.

Also disclosed herein is a method of presenting a game to a player. In this example embodiment, the method comprises the steps of providing a gaming device having player selectable two or more bonusing options and accepting at least one bonusing option selection from the player. This method also integrates the selected bonusing option with the gaming device, and provides a base game on the gaming device with eligibility to win the player selected bonusing option.

It is further envisioned that the method may also comprise the steps of receiving a wager on the base game, presenting a game to a player, determining a game outcome and then determining a bonusing option outcome based on the bonusing option selection from the player. The method may additionally include receiving a player selected bonusing option which will modify a payout scheme. This allows a player to choose a first modification that provides increased payouts with a decreased payout frequency, or the player may choose a second modification that provides decreased payouts with increased payout frequency. Additionally, the selected bonusing option may be communicated over a game network to a controller associated with the selected bonusing option.

It is contemplated that the method may include several types of bonusing options. In one embodiment, the bonusing options are selected from the group consisting of a progressive award, a mystery award, a tangible prize and a service award. In another embodiment, the bonusing option is randomly determined and configured by the game network or the plurality of bonusing options may be determined by player tracking identification.

This example method of operation may also comprise a method of presenting a game to a player having a first step of providing a gaming device having player selectable two or more bonusing schemes, wherein a first bonusing scheme is directed to modifications of a payout scheme and a second bonusing scheme providing a plurality of bonusing options. Another step of this method may comprise accepting at least one bonusing scheme selection from a player, such that the player is permitted to select a payout scheme, a bonusing option or both. The selected payout scheme and bonusing option may be integrated with the gaming device. This method also provides a base game on the gaming device with a modified payout scheme and eligibility, for the player, to win the player selected bonusing option.

In one variation of this method the player selectable first bonusing scheme comprises a modified payout scheme in which the player may choose a first modification that provides increased payouts with a decreased payout frequency. Or the player may choose a second modification that provides decreased payouts with increased payout frequency.

In one embodiment, the method further comprises the step of communicating the player selected bonusing options over a game network to a controller or server associated with the player selected bonusing option to thereby link the gaming device with the selected bonusing option. In another variation of the method, the gaming device randomly selects a bonusing option for the player. Additionally, the bonusing option may include several types of bonuses such as a progressive award, a mystery award, or a bonusing option that is determined by player tracking identification.

Also disclosed herein is a gaming device that is configured with a player selectable bonusing scheme. The gaming device has a housing, a display within the housing for displaying, to a player, a game. The device is configured to display, for selection by the player, one or more player selectable bonusing schemes. A network interface is provided for communication of the selected bonusing scheme over a network link while a user interface is provided and configured to receive player selections from the player. Overseeing or guiding operation of the machine is a processor configured to cause the display to present one or more bonusing schemes for player selection. This embodiment may also have more than one bonusing schemes. In one embodiment a first bonusing scheme comprises no bonusing options and the second bonusing scheme comprises a plurality of bonusing options.

Additionally, the gaming device may have a first bonusing scheme that further comprises a player selection option comprising a modified payout scheme in that provides increased payouts with a decreased payout frequency, or the player may choose a second modification that provides decreased payouts with increased payout frequency. Alternately the gaming device's first bonusing scheme may include a non-modified payout scheme. In one exemplary embodiment, the network interface is configured to transmit a selected bonusing scheme to a controller to thereby include or associate the gaming device with the selected bonusing scheme, such as at a remote server.

In another variation of the invention the gaming device is configured for a player selected bonus option. In this configuration the gaming device is configured with a housing, a display within the housing for displaying, to a player, a game and one or more player selectable payout schemes. A network interface for communicating a payout scheme over a network link is provided as is a user interface configured to receive player selections from the player. A processor may oversee or guide operation and cause the display to present one or more payout schemes for player selection. This variation may have a selected payout scheme that further comprises a player selection option in which the player may choose a first modification that provides increased payouts with a decreased payout frequency, or the player may choose a second modification that provides decreased payouts with increased payout frequency. Alternatively, the gaming device may include a player selectable payout scheme that includes a non-modified payout scheme.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE PREFERRED EMBODIMENTS

In the following description, numerous specific details are set forth in order to provide a more thorough description of the present invention. It will be apparent, however, to one skilled in the art, that the present invention may be practiced without these specific details. In other instances, well-known features are indicated but have not been described in detail so as not to obscure the invention.

Figure 1:
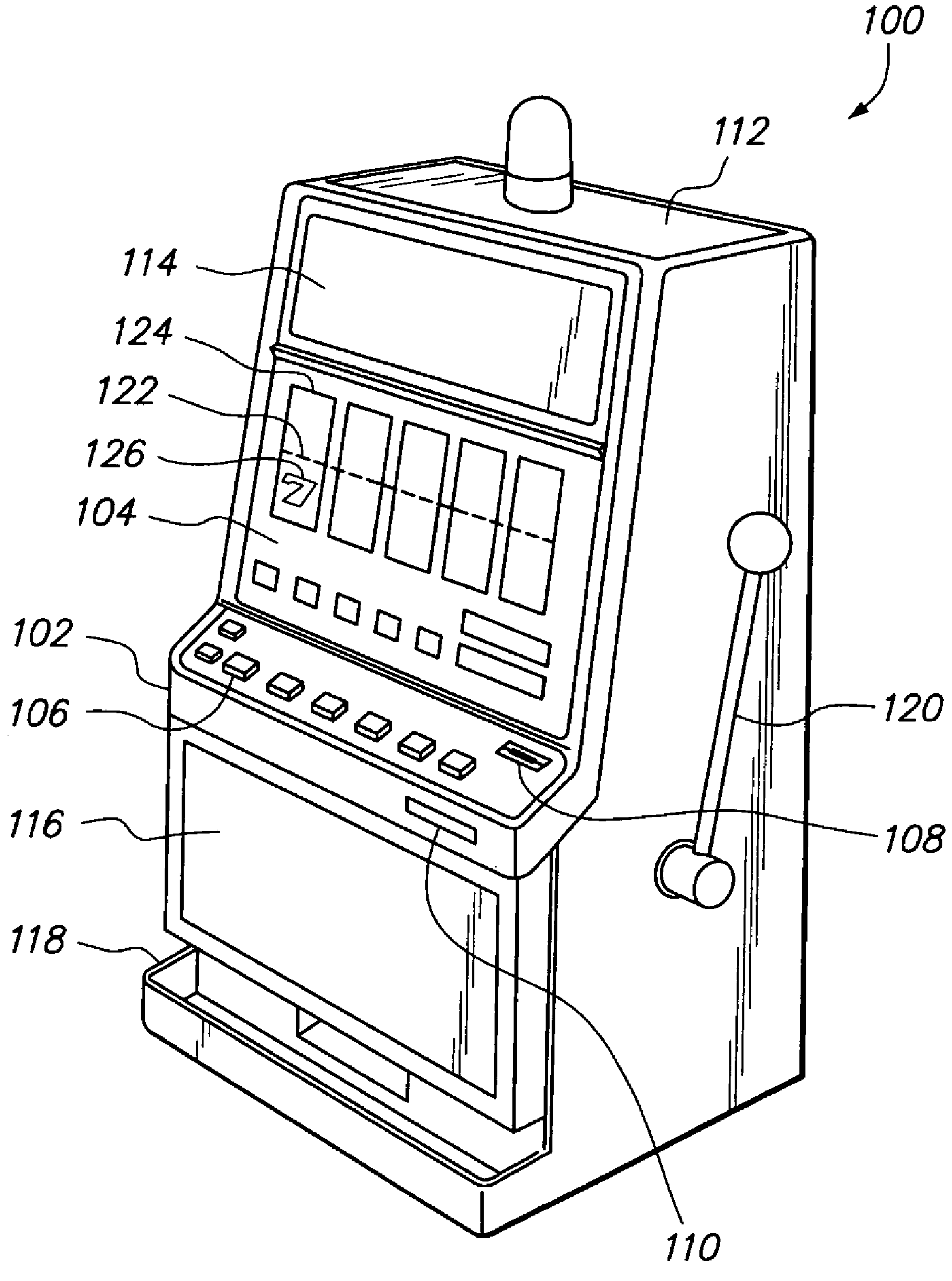
FIG. 1 is a perspective view of a gaming device.
Figure 2:
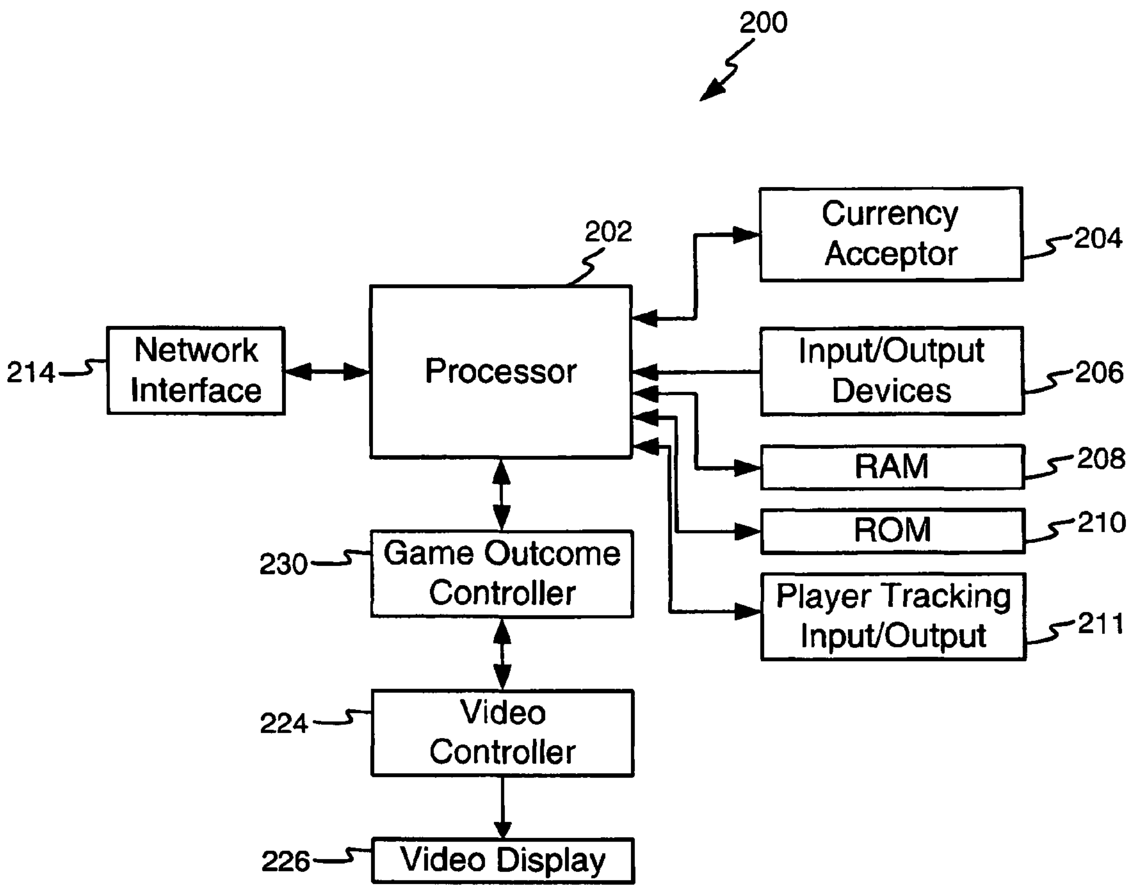
FIG. 2 is a block diagram of an example video based wagering system.
Figure 3:
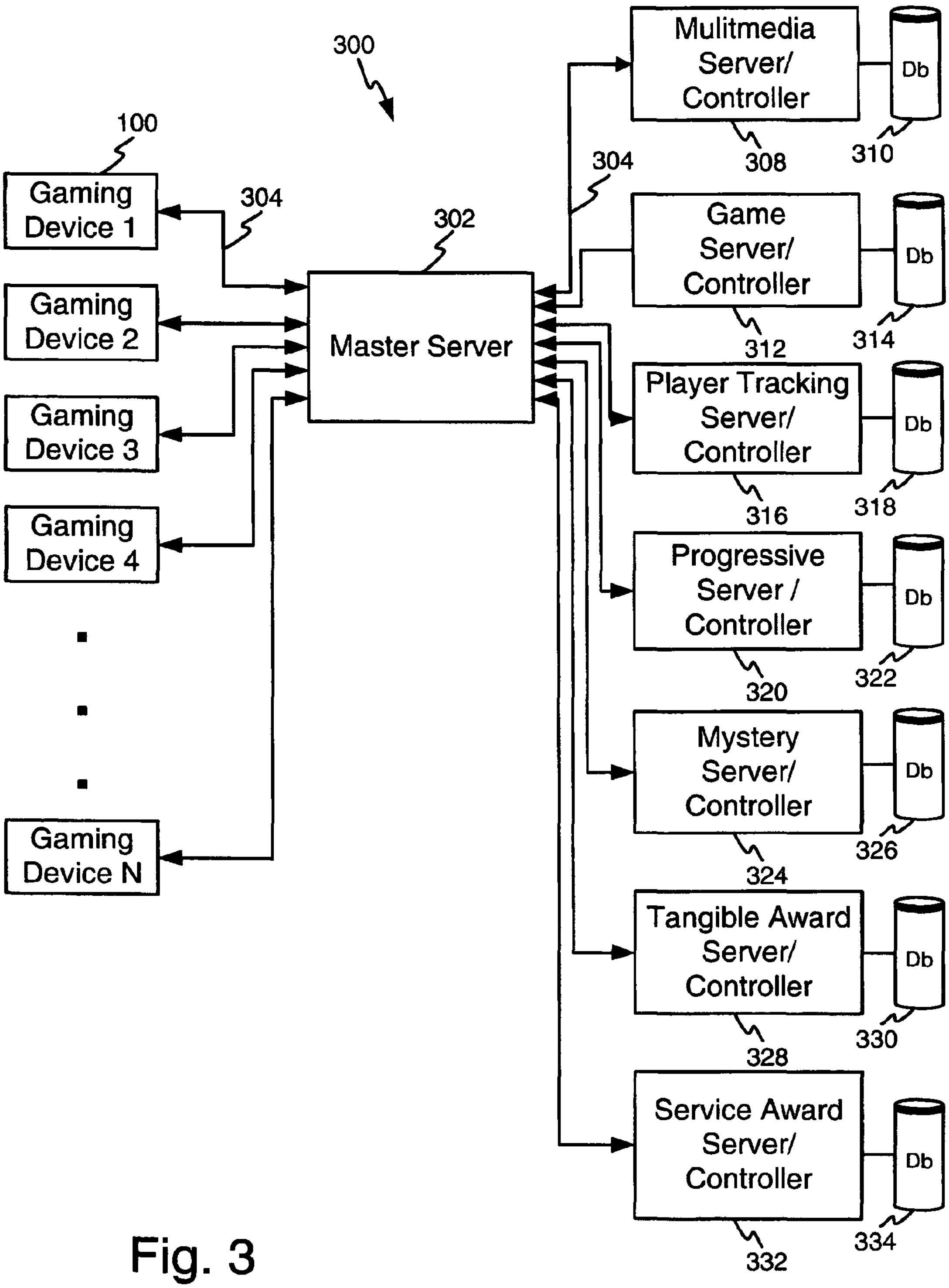
FIG. 3 illustrates an example embodiment of a game network with a plurality of gaming devices in communication with a series of servers and controllers.

FIGS. 1 through 3 provide a detailed description of a gaming device, internal components of the gaming device and a gaming network that are configured to facilitate a configurable gaming device with a player selectable bonusing scheme. The various bonusing schemes enables the gaming device to permit the player to participate in different bonusing options, such as modified payout rates, progressives, mysteries, or other awards. The following description in FIGS. 1 through 3 also provides both an overview of standard gaming device components and a detailed description of standard components that are configured to enable a gaming device with a player selectable bonusing scheme.

As defined herein the bonusing scheme is a broad term that encompasses all the various bonusing options/configurations, or lack thereof, for a gaming device. This includes participation in any type bonus option described herein, or no bonus participation as desired by the player. In addition, options may include increasing the payout rate or jackpot size of the gaming device, with or without bonus participation, or providing a standard gaming device play without any bonus or payout changes. It is contemplated that the various embodiments and claims that follow may be enabled alone or in any combination and the gaming device may be configured in any manner or using any procedure.

FIG. 1 illustrates a gaming device used in one embodiment that provides a player with a selectable award profile. The award profile or bonusing option may be controlled by central server data. As seen in FIG. 1, a gaming device 100 includes a game housing 102 and a game display area 104. The gaming housing 102 contains necessary hardware and software, currency handling and other components to enable play of the device. The game display area 104 is the primary area where the game communicates with the player and provides visual content relating to the play of the game including presenting the player with the option to select or configure an award profile. Typical player controls 106 are mounted on housing 102 in a position comfortably accessible to a player.

The gaming device 100 further includes an upper gaming housing, commonly referred to as a top box 112, an upper graphics area 114, and a lower graphics area 116, commonly referred to as bottom or belly glass. The top box 112 contains additional gaming device components and provides a viewing region for presenting additional graphics to the player. The lower graphics area 116 provides a graphical display area where various graphics may also be shown to the player.

In one embodiment, the gaming device 100 may be configured as a video type gaming machine, the machine including at least one game display area 104 for displaying game elements to a player such as cards or slot symbols. During play, of a "video" type gaming device the player attempts to receive certain combinations of symbols or game elements which are considered winning combinations. In one embodiment, a player configures or selects an award profile prior to receiving a set of game elements. The award profile will determine the optional bonusing scheme for the machine.

The gaming device 100 may include other means for providing information to a player. For example, speakers (not shown) or other devices may be provided for generating sounds associated with the game or player selectable award profile. The gaming device 100 may also include lights, printed instructions and other displays/display devices.

In one embodiment, the game is presented as a wagering type game, and a player must place a bet or wager in order to play the game for the opportunity to receive winnings. Preferably, if the player is a winner of the game, the player is provided an award, such as a monetary payout, credits representing monetary value, points or tangible prizes. As illustrated, the gaming device 100 may include a bill validator/acceptor/ticket acceptor incorporated into the currency insert slot 110 for accepting paper currency. The gaming device 100 may also include a coin acceptor 108 for accepting coins. Other means of payment, such as a credit card reader, may be provided. An award of winnings in the form of coins may be paid to the player via a coin tray 118.

The gaming device 100 may include means for a player to provide input for engaging in play of the gaming device 100 and selecting or configuring an award profile the inputs are commonly referred to as player controls. These player controls 106 typically include a spin button, a help button, a change button, a Play/Credit button, a Bet Max button, a Cash Out button, a coin acceptor or insert slot 108, and a currency insert slot or bill validator and/or acceptor 110. The spin button initiates the play of the game. The help button provides instructions and information relating to play of the game such as rules and payoff amount related to game outcomes. The change button summons gaming establishment personnel for making change or other assistance. The Play/Credit button enables the player to place a wager. The Bet max button enables a player to place the maximum wager for the game. The Cash Out button redeems gaming device credits for currency. Other means of input may be provided, such as a touch-screen display and other devices now known or later developed.

As indicated, in one embodiment, game information is displayed by a video version of the game display area 104 to a player. That video display may be of a variety of types, including CRT, LCD, plasma and any other means of displaying game information. The gaming device 100 may also include more than one video display.

In one embodiment, as described in more detail below, game information which is presented to a player comprises a plurality of video simulated reels 124 displaying game symbols 126. As indicated, these simulated video displays may be graphical representations of the reels 124 and symbols 126 on the game display area 104 or actual physical reels.

In a physical reel configuration 124 means are provided for rotating the physical reels 124. In one or more embodiments, the means may comprise a mechanical linkage associated with a spin arm 120. A user may pull the spin arm thereby causing the reels 124 to spin. In such an arrangement, the reels 124 are generally allowed to free-wheel and then stop. In another embodiment, electronically controlled mechanisms are arranged to rotate and stop each reel 124. Such mechanisms are well known to those of skill in the art and are commonly referred to as stepper motors or other electromechanical system. In this arrangement, actuation of the spin arm 120 or depression a spin button causes a game processor (not shown) to activate the spin mechanism associated with one or more of the reels 124 in response to a random number or other signal. The processor may be arranged to either turn off the signal to the device(s) effecting the rotation of each or all of the reels 124 or generates a signal for activating a braking device, whereby the reels 124 are stopped. In one embodiment a processor output controlled by or based on a random number is provided to a controller, which in turn controls the stepper motor to stop each reel in the desired position. As is well known, the combinations of reel positions and the odds of receiving a winning combination are determined by the processor, and the processor output controls the reel position to thereby display a combination of indicia. The principal of such an arrangement is described in U.S. Pat. No. 4,448,419 to Telnaes, which is incorporated herein by reference.

The gaming device 100 may have other configurations, including other features. The gaming device 100 may include a user input to allow the user to provide input to the machine, such a touch screen, key pad, buttons, or other input device. In addition, the gaming device 100 may include a player tracking device (not shown), such as a card reader and/or associated keypad. Such player tracking devices are well known and may permit the game operator to track play associated with a player of the gaming machine. The tracked play may be utilized to offer player bonuses, awards or to custom configure the gaming device with player preferences such as player favored visual elements.

In one embodiment, the gaming device 100 may be configured to dispense media, such as printed paper tickets, which have associated value. For example, winnings or unused credits may be returned to the player via a printed ticket having value or associated value. In one embodiment, the gaming device 100 might also be configured to accept such media for providing credit for game play. Such "ticket in/ticket out" systems are well known and thus not described in detail herein.

A player may provide value to the gaming device 100 or machine operator in a number of ways, including with coins or bills. The player might also be permitted to provide value remotely.

Once the player provides value, the player preferably places a wager to play the game. This may be accomplished, in one embodiment, by the player pressing the "bet one" button or the "bet max" button, or by other player input means.

Preferably, in response to the player placing a wager (or other or additional input, such as player input to a "spin" button or rotation of a handle or spin arm 120), a plurality of symbols or indicia are displayed to the player. The processor of the gaming device 100 is configured to randomly select or generate the symbols 126 for display. Methods of generation/selection are well known and may include the generation of random numbers which correspond to symbols for display.

The symbols 126 are displayed to the player. In one embodiment, display of the symbols is via the simulated video version of the game display area 104. In another embodiment, the display of the symbols 126 could be by one or more physical devices, such as physical reels 124, or a combination of physical reels 124 and virtual reels displayed by a display.

As detailed below, the symbols may be displayed in a variety of formats or arrangements. In an embodiment of the invention where the symbols are displayed by a video display, the symbols are preferably displayed in a plurality of reel-type columns similar to the manner symbols are displayed by physical rotatable reels 124 in well-known slot machines. In such a configuration, each column may display a plurality of symbols. In one common configuration, five (5) columns of three (3) symbols, thus comprising a three (3) by five (5) matrix of symbols (such as representative of five reels each displaying three positions of symbols), are displayed. Any number of reels, either actual or simulated, may be displayed.

An outcome of the game is determined by or from the combination of symbols which is generated and/or displayed. In one embodiment, one or more combinations of symbols are declared "winning" combinations. Those combinations may be referred to as "predetermined winning combinations," since it is predetermined that those combinations, if generated as a result of game play, comprise winning combinations.

A determination is made, in at least one instance, with respect to symbols 126 appearing along paylines 122 and, preferably, active paylines. In this context, active means that the player has placed a sufficient wager to activate the payline 122. Thus, the active payline is included in determining if a winning combination of symbols 126 has been generated.

A minimum wager may activate one or more paylines 122, while larger wagers may activate additional or all of the paylines 122. For example, there may be five (5) paylines and the player may be permitted to place a wager of one (1) to five (5) credits. In such a configuration, one (1) payline may be activated for each credit which is wagered. Thus, all five (5) paylines would only be activated in the event the player wagered a five (5) credit wager minimum.

FIG. 2 is a block diagram illustrating a system 200 configured within a video version of gaming device to facilitate game play and player selection of an award profile controlled by central server data. A game processor 202 is provided for controlling the various components of the gaming device and may determine game outcomes. The game processor 202 may be configured to control and present a player with a choice of selectable award profiles and subsequently accept a player selection of a preferred award profile and/or bonusing option. This selection may control the payout schedule for the machine or link the machine to one or more different bonus award. In one embodiment the processor 202 may generate random numbers. The game outcomes may also be received from a central server configured to communicate and provide game outcomes to a gaming device. The game processor may be in the machine 100 or at a central server which is in electronic communication with the machine. The central server configuration is discussed below in more detail in connection with FIG. 3. It is contemplated that any embodiment described herein may be enabled in a machine based or central server configuration.

The processor 202 communicates with numerous peripheral devices. One such peripheral device is a currency acceptor 204 which may include a ticket acceptor and/or coin acceptor and/or a bill validator that accepts currency for registering credits on the gaming device. The game processor 202 may be arranged to detect a signal for causing a coin delivery mechanism, such as a coin hopper (not shown) to deliver coins to the coin tray as payment of winnings or redemption of credits to a player.

Preferably, the gaming device has one or more input/output devices 206 that provide information to the game processor 202 for use in play of the game. For example, in response to a bet one input by a player, the game processor 202 receives a signal which causes the game processor to initiate presentation of the game. The input/output devices may also provide an interface by which the player may configure or select an award profile prior to commencing game play. The game device further includes memory, such as random access memory (RAM) 208 and read only memory (ROM) 210 that facilitates game processor 202 operation. Additional memory, such as a hard drive may also be present.

A player tracking input/output 211 is provided on the gaming device and may be in communication with the processor as shown. The player tracking I/O 211 facilitates information gathering and data acquisition for a particular player. Such systems are well known and thus not described in detail herein.

In this embodiment the game processor 202 may be arranged to interface with the game outcome controller 230 to present game outcomes of the gaming device. The central server configuration is generally understood by one of ordinary skill in the art and hence is not discuss in great detail herein. In a central server configuration, the gaming device receives game outcomes from the game server 312 (FIG. 3). In this configuration, the random number generation and associated processing may occur at the game server 312. In such an embodiment the gaming device 100 may be configured to a multi-media rich presentation, while game outcome generation is performed remotely. This may reduce cost, increase security, and provide greater game flexibility.

The game outcome controller 230 generates operative signals that are sent to a video controller 224. In turn, the video controller 224 generates signals for display on a video display 226 that is operatively associated with the gaming device. On the video display 226, various game outcomes are visually represented to the player. The bonus round may be sent from the game server, such as in central server configuration, or may be generated by the gaming machine. The video display 226 also visually presents to the player a plurality of award profiles/bonusing options which the player may select for participation.

The gaming device may have a variety of configurations and additional components such as a network interface 214 for sending and receiving game information and player configurations or selections of an award profile. For example, a master server, which is discussed below, may interface with the gaming device to facilitate functionality such as: accepting a player configured or selected award profile, player tracking, accounting and ticket-in/ticket-out processing.

FIG. 3 illustrates an example block diagram showing several gaming devices 100 connected via an integrated game network 300 so that a player may select and link the gaming machine with an award controller based on the selected award profile. The master server 302 facilitates and controls communication by way of several bi-directional communication links 304 between a series of gaming devices 100 and a series of dedicated server/controllers. The gaming devices 100 are designated by any whole number 1 through N, where N is any whole number. The dedicated server/controllers may have several independent functions related to the game network 300 and may provide the player with multiple bonus options from which to choose. Exemplary bonusing options are discussed in greater detail below. Preferably, each of the bonus options entice the player to engage in game play, provide enhanced game value and increase the entertainment value of the gaming device 100.

Once such dedicated server/controller may be a multimedia server/controller 308 with an associated database 310. The multimedia server/controller 308 may comprise a central server. The multimedia server/controller 308 communicates with the gaming devices 100 by way of the master server 302 and communication link 304 and provides various graphical and audio data for associated game play at the gaming devices 100.

Game server/controller 312 and associated database 314 communicates the gaming device in the same was as previously described. The game server/controller 312 may be configured to provide game related data essential for game play. For example, the game server/controller 312 may generate the random outcomes for the game or may initiate a bonus round.

Player tracking server/controller 316 and database 318 provide functionality for the player tracking system commonly used in gaming establishments. The player tracking server/controller 316 may provide a gaming device 100 with relevant information regarding the active player and may additionally receive information regarding the player's preferences.

A progressive server/controller 320 and associated database 322 provide functionality for a gaming device 100 to participate in a progressive jackpot. Progressive jackpots/awards provide a player with the opportunity to win an extremely large payout. Progressive jackpots are well known in the gaming industry and not described in detail herein.

Mystery server/controller 324 and database 326 provide another form of a bonus option available to the player. In this category of bonus option the player may receive a random prize that is not tied to: any reel combination or game outcome. Game outcome could mean a specific range of hands in a video poker game such as a pair of jacks or better. The player is enticed to choose this type of bonus option because there is additional excitement in receiving an unexpected award of unknown value. The player may just receive this bonus option as the casino's way of fostering player enjoyment such as Station Casino's Jumbo Jackpot Boarding Pass Bonus™.

The tangible award server/controller 328 provides a bonus option that is based upon a tangible item such as a car, boat or other item of value. Database 330 is associated with the tangible award sever/controller 328 to facilitate game play under this bonus option.

The service award server/controller 332 and associated database 334 provides a bonus option related to a player desired service such as an all expense paid vacation. In this bonus option, the player has a personal interest or desire to receive the service and correspondingly selects this option.

In addition, the master server 302 may provide game related information, such as game software updates, which are then transmitted over a communication link to the gaming device. The gaming device 100 may be a thin client (i.e. dumb terminal) or in a downloadable format (i.e. where the games are downloaded and the random number generator resides on the terminal). That information may be utilized by a local gaming device 100 game processor 202 to present a game to a player. Any amount/type of game information, control information or bonusing options may be transmitted over the game network 300.

Figure 4A:
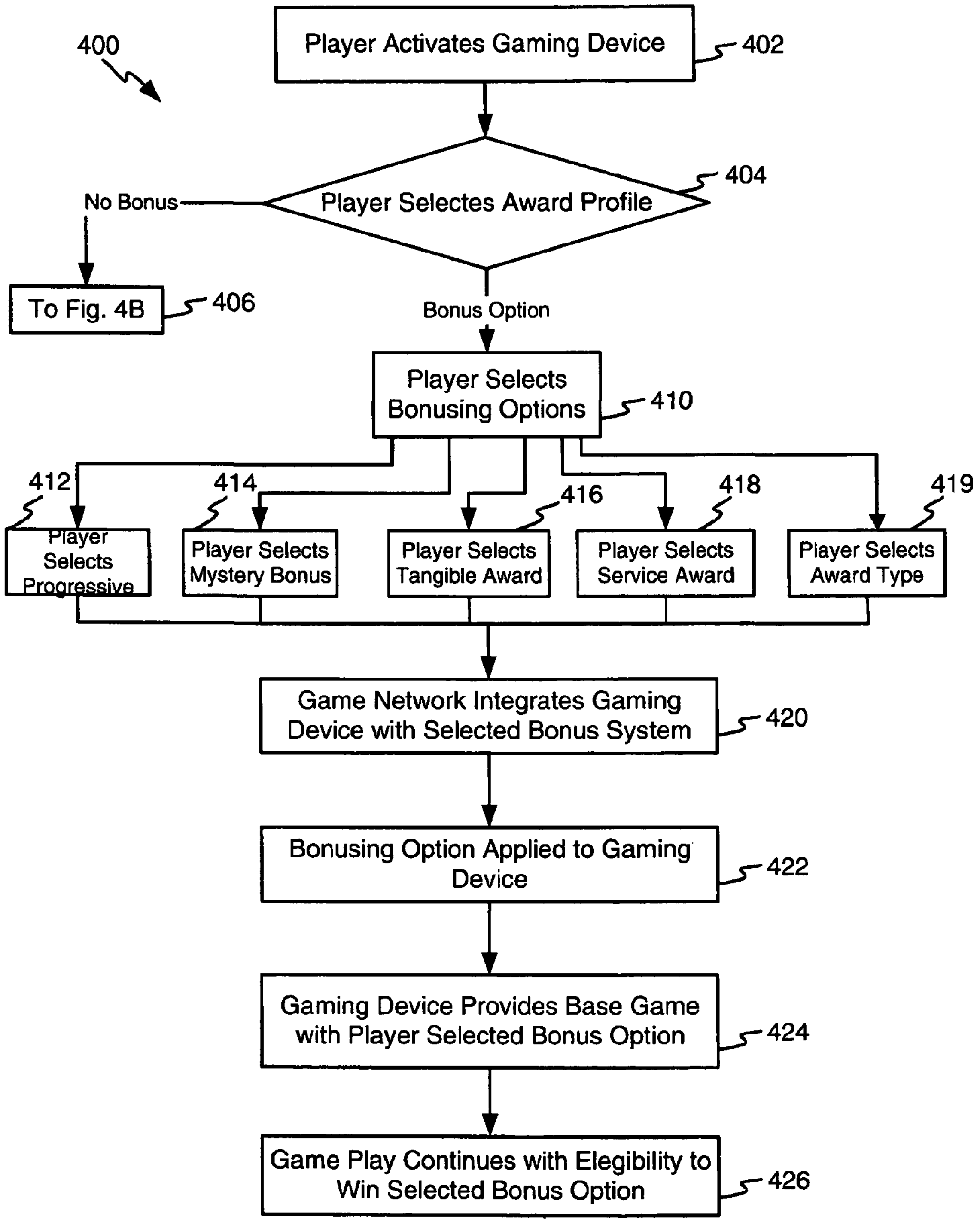
FIG. 4A in an operational flow diagram that illustrates one example method of player selectable bonusing options.

Reference is now made to FIG. 4A which illustrates an operational flow diagram of one example method of a player selecting award profiles. This is but one possible method for configuring award profiles to meet player preferences and as such it is contemplated that other methods of operation may be enabled based on this disclosure. This example method for a player configurable award profile system 400 begins with the player activating the gaming device in step 402. A player may initialize a gaming device by inserting currency, token or other wager establishing techniques. Once the gaming device is activated the player is presented with an option to select an award profile in step 404. The award profile selection option is presented to the player by way of the game display area. It is also contemplated that this option screen may be provided to the player at any time during play.

In a preferred embodiment the player is presented at least two options for selecting an award profile. If the player does not want a secondary bonus, then the player would select the operation to step 406, which in turn advance the method to additional gaming device configuration possibilities as discussed in detail below in connection with FIG. 4B. In contrast, if the player wants multiple bonusing options, the player would select from multiple bonusing at a step 410. At step 410 the player selects a bonusing option that is subsequently included in configuring the gaming device. This allows the player to configure the bonusing aspects of the machine as preferred by the player.

For example, the player may advance to step 412 wherein the player selects is a progressive jackpot as the top award in a bonus round. In a progressive type of jackpot, several gaming devices are linked together by way of a gaming network. An initial amount may be used to seed the progressive jackpot and subsequently a portion of the amount wagered on each gaming device participating in the progressive may be added to the jackpot. In this way the progressive jackpot continually increases in value until a player wins the progressive jackpot. This type of bonus option is very conducive to a player because a player has the potential win a very large award. The progressive server/controller may facilitate the functional characteristics of this bonus option by receiving and storing pertinent information in the dedicated database. The communication between the progressive server/controller and gaming device is by way of the bi-directional communication links 304 and gaming device identification indicia. This identification may take the form of a unique game network address or alphanumeric code that is assigned the gaming device.

Another type of bonusing option that may be presented to a player is a mystery bonus, which is selected at a step 414. When a player selects a mystery bonus at step 414, the player is eligible to participate in a mystery bonus. In general, a mystery bonus is an award that hits at a time unrelated to reel combination or game outcome. In this way, when the mystery award will be hit is a mystery to the players. The term hit is a common term used to describe when a winning outcome in a game of chance has occurred. As the mystery progressive increases with each bet, the player placing the final wager over the game network that satisfies the predetermined currency amount or at the random time of award will generally win the mystery Jackpot®. This type of bonus option is very enticing to a player because the player is usually unaware of the predetermined amount and when the jackpot may hit. This type of bonus provides the player with additional excitement and an enhanced gaming experience.

In another type of bonusing option, the player may select to participate in a bonus, at a step 416, that provides a tangible prize. Examples of a tangible prize are bonuses that may provide a new car, boat, diamond ring, fur coat, etc. as an award for obtaining a winning outcome in the bonus round.

In a similar fashion, the player may select a bonus option, at a step 418, based upon a service award. A service award bonus grants the player an award of a service such as a vacation, trip to luxury spa, or other service orientated prize of value.

At step 419, the player may select the type of bonus round. The bonus round that can be selected would be a wheel, a quest bonus, or a pick and win. The player can select between different graphics within the same type of bonus round. For example, for a pick and win the player could pick bars of gold which hide the prizes or armored trucks.

Another solution is to have more than one bonus rounds in one game. One bonus round could be a ‘pick and win’ while another could be a wheel. Each different bonus round is triggered by a different reel combination. Some players may like one bonus round over another on a particular slot machine. If players liked all bonus rounds on a slot machine then there would be more enjoyment for the player. There could be many mystery bonus rounds which are not triggered by a reel combination.

Once the player has selected a bonusing option in step 410-419, the game network integrates the gaming device with the selected bonus system. In step 420 the game network establishes the necessary communications between the gaming device and the selected bonusing option server/controller to thereby link the gaming machine with the desired bonus award. The selected bonusing option server/controller then receives and sends pertinent information, from the associated database and master server to the player’s gaming device to establish the link.

In step 422, the player selected bonusing option is applied or linked to the gaming device. The application of the bonusing option may include downloading or uploading the required files and information from the proper server/controller to the player’s gaming device to facilitate game play with the selected bonus option. Next, the gaming device provides the base game to the player with the player’s selected bonus option at a step 424. The odds of the base game may change based on the selected bonusing option. The gaming device remains configured in this manner in step 426 or until the player decides to select a different award profile.

Figure 4B:
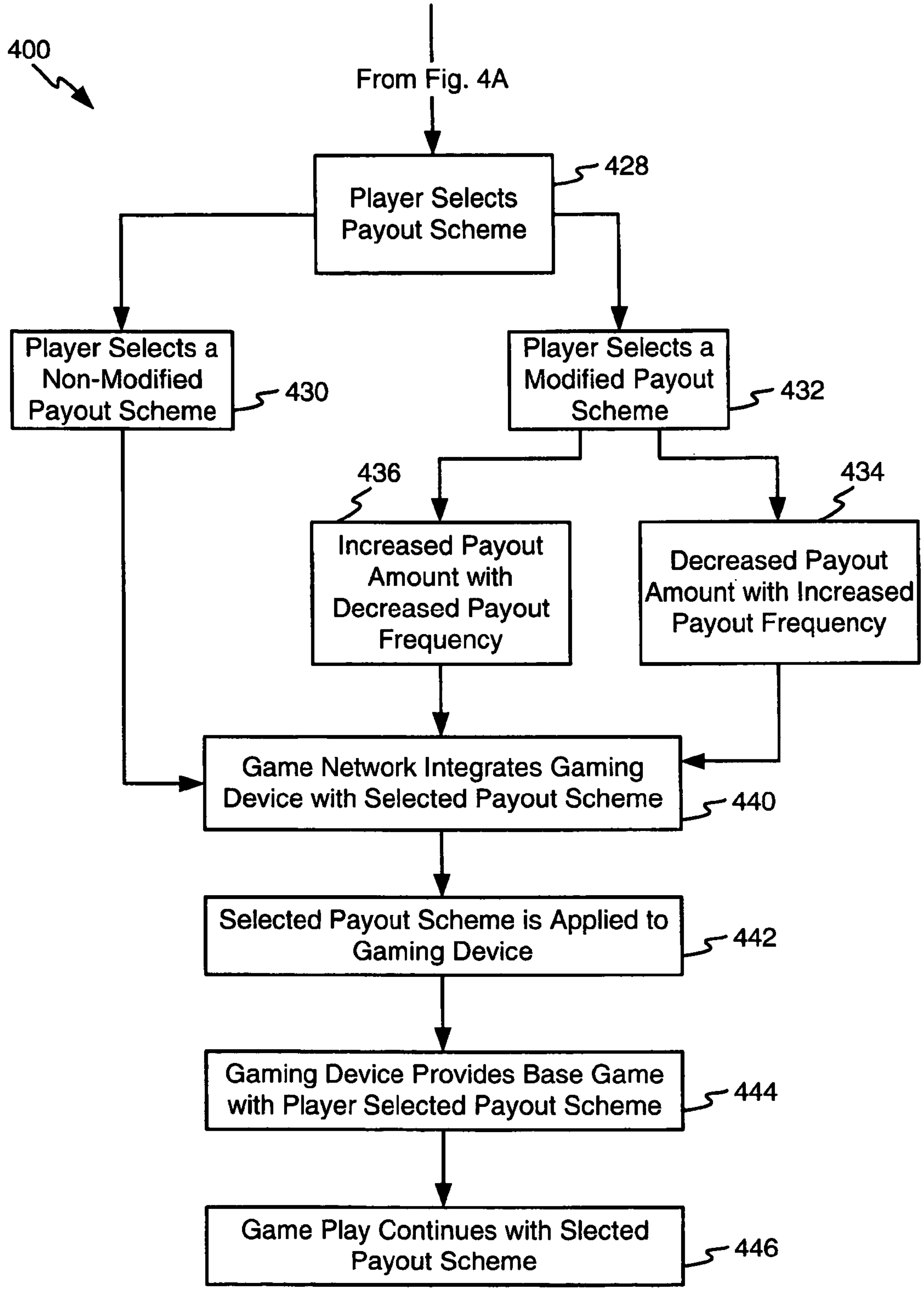
FIG. 4B is an operational flow diagram of one example method of performing a player selectable payout scheme.

FIG. 4B illustrates an operational flow diagram of one embodiment for a player selectable payout scheme. When the player decides in step 404 to advance to step 406 and participate in a non-bonus award profile then the player may be presented further options to configure the gaming device to the player’s preferences in step 428. A player may select a non-modified payout scheme in a step 430, in which the gaming device provides a game with a standard unaltered payout scheme. Another choice the player may be presented in a non-bonus award profile, is to select a modified payout scheme, at a step 432. The modified payout scheme of step 432 may further include several options that modify the base game’s payout scheme. One such modified payout scheme is selected at step 434, which comprises decreasing the payout amount and increasing the frequency of payouts. The player may also select the scheme of step 436, which comprises increasing the payout amount and conversely decrease the payout frequency. By providing the player with flexibility in modifying the payout scheme the player’s gaming preferences and instantaneous moods may be accommodated without forcing the player to leave their current machine in search of another machine that meets their needs. For example, a player may desire to play the gaming device for a prolonged period of time while visiting with friends. In this circumstance the player may prefer to have smaller awards but have the awards hit more frequently (i.e. step 434 of FIG. 4A) and thus the player can engage the gaming device for a long time interval. This provides the player with increased entertainment value for the amount of currency wagered, although the chance of a large jackpot payout is diminished.

In contrast, the player may feel extremely lucky at the present time and prefer to play for a big payout. If this is the case, the invention provides the player with the modified payout scheme in step 436 that increases the payout amount, but decreases the frequency of receiving a winning outcome. Thus, although the player may not win often, when such wins do occur, the jackpot may be substantial.

Alternatively, if at step 428, the player may select to participate in non-modified payout scheme. In this option, the player proceeds to play the gaming device with the standard payout scheme as originally configured within the gaming device. This may be set by the casino or game manufacture. In one embodiment this provides balanced play by providing payout scheme that provided both large jackpots and frequent small wins, although both may be at a slightly diminished rate. Thus, the player is still able to select a traditional payout scheme.

After the player selects a payout scheme, the player configurable award profile system 400 proceeds through steps 440, 442, 444 and 446. These steps are generally similar to steps 420, 422, 444, and 446 as discussed above, and as such, these steps are not discussed above.

In one embodiment, the game device further includes a bonusing option that may be randomly selected by the gaming device from the available listing of bonus options. In this embodiment the player selects to participate in a bonusing option but the player leaves the specific bonus option selection to be determined at random by the gaming device. This embodiment may be further enhanced by permitting the gaming device to configure various aesthetic elements of the bonus option. By doing so, the player is provided a unique gaming experience that includes variety in the bonusing options and appearance of these options.

In another embodiment, the player may be presented bonusing options that are specifically directed to the player's demographics. By using the player tracking functionality of the gaming device, the gaming establishment can offer targeted bonusing options that are custom tailored to a particular player group. For example, a younger player may have a greater interest in particular events that are youth based such as extreme sports. Conversely, the seasoned player may have a preference in classical music and prefer a bonus option based on various classic composers.

As a result, it is contemplated that the bonusing options presented to the player may present bonus options which are likely to entice the player to continue playing. In one embodiment this means that the particular bonusing round may comprise an event or be based on a topic that appeals to the player. For example, a younger player may be presented with an action event, or a player interested in sports may be presented with a sports based bonus event.

In one embodiment the awards are tailored to the demographics of a player. For example, younger players may be awarded sports cars while older players may be awarded luxury sedans thereby enticing both demographic groups to continue playing. Other tangible or services awards may also be tailored to the specifics of the player. The player may select the award or the casino may select or pre-select the award that is presented.

It is further contemplated that all of the player selectable bonusing options may be selected by the player when the player arrives at the gaming machine, or preconfigured and stored in their player ID card/account. In this manner, the player may preconfigured their preferred bonusing options and then, upon inserting their card or other form of ID to the machine, the machine will be automatically configured.

As will now be apparent, gaming devices fabricated according to the teachings of the invention afford a number of advantages over known gaming devices limited to a fixed award profile and limited bonusing options.

Firstly, incorporating a plurality of bonusing options increases the gaming device's flexibility. A traditional gaming device commonly provides only a fixed or limited number of bonuses. These gaming devices must be grouped together in specific areas of the gaming establishment, such as in banks. When a player chooses to participate in a different bonus option that player generally has to relocate to a different grouping of gaming devices. It is common for the player to arrive at the new grouping and find all the gaming devices already in use by other players. By enabling a gaming device to offer a selection of several popular bonusing options, the gaming devices are more versatile and continuous play is more likely. Consequently, a gaming establishment may enjoy increased revenue because of the continuous play.

Secondly, by providing a player selectable award profile, the player may continue to play the gaming device for longer durations of time. The teachings of the present invention allow a player that is discontent with a particular bonusing option to change the bonusing option and continue play from the same gaming device. As used herein the term bonusing option means the payout structure of the machine, whether participating in bonus rounds, progressives, mysteries, and/or the payout structure of the machine. In this way, the player has increased control of their game experience and is not required to abandon a favored gaming device in order to participate in a different bonus option or payout scheme. The player can also maximize enjoyment at one particular machine. The gaming establishment benefits by having the player continue game play at the same gaming device and not requiring the player to relocate to a different gaming device in order to participate in a different bonus option. The player is less likely to become distracted and lose interest in playing since the player does not have to move about the busy casino floor, or simply leave the casino after getting up to find a new machine and losing interest in gambling or noticing the late hour of the day.

Thirdly, the player enjoys increased control of the gaming experience and can adapt the gaming device to suit the player's current desires and preferences. The result being that the player will enjoy and desire playing the gaming device for extended periods of time, which will increase gaming establishment revenue.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A gaming device comprising:

a housing;

a display device within the housing;

a user interface;

a processor; and a memory device storing a plurality of instructions which when executed by the processor, cause the processor to operate with the display device and the user interface to:

(a) enable the player to place a wager on a play of a game;

(b) after the wager is placed and prior to any determination of whether to trigger any bonus event:

(i) enable the player to designate one of:

(A) eligible for a bonus event; and (B) not eligible for any bonus event; and (ii) if the player designated as eligible for the bonus event:

(A) display a plurality of different bonus event options to the player; and (B) enable the player to select one of the displayed plurality of different bonus event options; and (c) thereafter:

(i) if a determination to trigger the selected bonus event option occurs, trigger the selected bonus event option; and (ii) if a determination to trigger any bonus event occurs and the player designated as not-eligible for any bonus event, do not trigger any bonus event.

2. The gaming device of claim 1, wherein if the player designated as not-eligible for any bonus event, the plurality of instructions, when executed by the processor, cause the processor to:

(i) display a plurality of different payout schemes to the player, the plurality of different payout schemes including:

(A) a first payout scheme which provides increased payouts with a decreased payout frequency, and (B) a second payout scheme which provides decreased payouts with increased payout frequency; and (ii) enable the player to select one of the plurality of different payout schemes.

3. The gaming device of claim 2, wherein the plurality of different payout schemes includes a non-modified payout scheme.

4. The gaming device of claim 1, further comprising a network interface controller which is configured to transmit a selected bonus event option to the gaming device to thereby include or associate the gaming device with the selected bonus event option.

5. The gaming device of claim 1, wherein the plurality of different bonus event options comprises a mystery award.

6. The gaming device of claim 1, wherein the plurality of different bonus event options comprises an award of physical goods.

7. The gaming device of claim 1, wherein the plurality of different bonus event options comprises a progressive award.

8. The gaming device of claim 1, wherein the plurality of different bonus event options comprises a wheel bonus round.

9. The gaming device of claim 1, wherein the plurality of different bonus event options comprises a quest bonus round.

10. The gaming device of claim 1, wherein the plurality of different bonus event options comprises a pick and win bonus round.

11. A method of operating a gaming device including a plurality of instructions, the method comprising:

(a) enabling a player to place a wager on a play of a game at the gaming device;

(b) after the wager is placed and prior to any determination of whether to trigger any bonus event:

(i) enabling the player to designate one of:

(A) eligible for a bonus event; and (B) not-eligible for any bonus event; and (ii) if the player designated as eligible for the bonus event:

(A) causing a display device to display a plurality of different bonus event options to the player; and (B) enabling the player to select one of the displayed plurality of different bonus event options; and (c) thereafter:

(i) if a determination to trigger the selected bonus event option occurs, causing a processor to execute the plurality of instructions to trigger the selected bonus event option; and (ii) if a determination to trigger any bonus event occurs and the player designated as not-eligible for any bonus event, not causing the processor to execute the plurality of instructions to trigger any bonus event.

12. The method of claim 11, further comprising, if the player designated as not-eligible for any bonus event, causing the display device to display a plurality of different payout schemes to the player, the plurality of different payout schemes including:

(i) a first payout scheme which provides increased payouts with a decreased payout frequency, and (ii) a second payout scheme which provides decreased payouts with increased payout frequency.

13. The method of claim 11, further comprising causing a network interface controller to transmit the selected bonus event option over a game network to the gaming device to thereby include or associate the gaming device with the selected bonus event option.

14. The method of claim 11, wherein the bonus event options are selected from the group consisting of a progressive award, a mystery award, a tangible prize and a service award.

15. The method of claim 11, wherein the selection of a bonus event option is randomly determined and configured by a game network.

16. The method of claim 11, wherein the plurality of bonus event options displayed to the player are determined by player tracking identification.

17. A method of operating a gaming device including a plurality of instructions, the method comprising:

(a) enabling a player to place a wager on a play of a game; and (b) after the wager is placed and prior to any determination of whether to trigger any bonus event:

(i) enabling the player to designate one of:

(A) eligible for a bonus event; and (B) not-eligible for any bonus event; and (ii) if the player designated as not-eligible for any bonus event:

(A) causing a display device to display a plurality of different payout schemes to the player;

(B) enabling the player to select one of the displayed plurality of different payout schemes; and (C) if a determination to trigger any bonus event occurs, not causing a processor to execute the plurality of instructions to trigger any bonus event.

18. The method of claim 17, wherein the plurality of different payout schemes includes:

(a) a first payout scheme which provides increased payouts with a decreased payout frequency, and (b) a second payout scheme which provides decreased payouts with increased payout frequency.

19. The method of claim 17, wherein the plurality of displayed payout schemes are determined by player tracking identification.

20. A gaming device comprising:

a housing;

a display device within the housing;

a user interface;

a processor; and a memory device storing a plurality of instructions which when executed by the processor, cause the processor to operate with the display device and the user interface to:

(a) enable the player to place a wager on a play of the game; and (b) after the wager is placed and prior to any determination of whether to trigger any bonus event:

(i) enable the player to designate one of:

(A) eligible for a bonus event; and (B) not-eligible for any bonus event;

(ii) if the player designated as not-eligible for any bonus event:

(A) display a plurality of different payout schemes to the player;

(B) enable the player to select one of the displayed plurality of different payout schemes; and (C) if a determination to trigger any bonus event occurs, do not trigger any bonus event.

21. The gaming device of claim 20, wherein the plurality of different payout schemes includes:

(i) a first payout scheme which provides increased payouts with a decreased payout frequency, and (ii) a second payout scheme that provides decreased payouts with increased payout frequency.

22. The gaming device of claim 20, wherein the plurality of different payout schemes includes a non-modified payout scheme.

* * * * *

UNITED STATES PATENT AND TRADEMARK OFFICE

CERTIFICATE OF CORRECTION

PATENT NO. : 8,029,355 B2
APPLICATION NO. : 11/642243
DATED : October 4, 2011
INVENTOR(S) : Robert J. Parente It is certified that error appears in the above-identified patent and that said Letters Patent is hereby corrected as shown below:

IN THE CLAIMS:

In Claim 1, column 15, line 3, after "which" add a --,--.

In Claim 1, column 15, line 6, replace "the player" with --a player--.

In Claim 1, column 15, line 11, replace the space between "not" and "eligible" with a -- - --.

In Claim 20, column 17, line 6, after "which" add a --,--.

In Claim 20, column 17, line 9, replace "the player" with --a player-- and "the game" with --a game--.

In Claim 20, column 17, line 15, after "event;" add --and--.

Signed and Sealed this
Nineteenth Day of February, 2013

Teresa Stanek Rea
*Acting Director of the United States Patent and Trademark Office*